United States Patent [19]

Salee et al.

[11] 4,444,960

[45] Apr. 24, 1984

[54] POLYMER BLENDS WITH IMPROVED HYDROLYTIC STABILITY

[75] Inventors: Gideon Salee, Williamsville; Jerold C. Rosenfeld, Tonawanda, N.Y.

[73] Assignee: Occidental Chemical Corporation, Niagara Falls, N.Y.

[21] Appl. No.: 203,765

[22] Filed: Nov. 3, 1980

Related U.S. Application Data

[63] Continuation of Ser. No. 921,026, Jun. 30, 1980, abandoned.

[51] Int. Cl.$^3$ .................... C08L 67/02; C08L 81/08
[52] U.S. Cl. .................................... 525/534; 525/535
[58] Field of Search .................... 525/437, 534, 535

[56] References Cited

U.S. PATENT DOCUMENTS

| | | | |
|---|---|---|---|
| 3,262,914 | 7/1966 | Goldberg et al. | 528/175 |
| 3,755,256 | 8/1973 | Beverly | 525/535 |
| 4,051,096 | 9/1977 | Koseki et al. | 525/535 |

OTHER PUBLICATIONS

Frazer, High Temperature Resistant Polymers, pub. 1968, pp. 127–132.

*Primary Examiner*—John Kight, III
*Assistant Examiner*—Amelia B. Yarbrough
*Attorney, Agent, or Firm*—James F. Tao; James F. Mudd

[57] ABSTRACT

This invention relates to substantially transparent solid solution polymer blends having improved hydrolytic stability, and flexibility which comprise, in admixture, (1) a linear aromatic polyester of a dicarboxylic acid and a bisphenol, and (2) a linear aromatic polysulfonate of a bisphenol and a disulfonic acid. The polyblends are useful in preparation of films and molded articles.

21 Claims, No Drawings

POLYMER BLENDS WITH IMPROVED HYDROLYTIC STABILITY

This is a continuation of application Ser. No. 921,026, filed June 30, 1980, now abandoned.

BACKGROUND OF THE INVENTION

This invention relates to blends of linear aromatic polyesters and linear aromatic polysulfonates. More particularly it is directed to polyblends of polyesters derived from a bisphenol and a dicarboxylic acid with polysulfonate polymers derived from a bisphenol and a disulfonic acid. It is especially concerned with solid solution polyblends of the foregoing polymeric components.

Linear aromatic polyesters prepared from dicarboxylic acids, especially from aromatic dicarboxylic acids and bisphenols are well known for their suitability for molding, extrusion, casting, and film-forming applications. For example, U.S. Pat. No. 3,216,970 to Conix, disclose linear aromatic polyesters prepared from iso-phthalic acid, terephthalic acid, and a bisphenolic compound. Such high molecular weight compositions are known to be useful in the preparation of various films and fibers. Further, these compositions, when molded into useful articles using conventional techniques, provide properties superior to articles molded from other linear polyester compositions. For instance, aromatic polyesters are known to have a variety of useful properties, such as good tensile, impact, and bending strengths, high thermal deformation and thermal decomposition temperatures, resistance to UV irradiation and good electrical properties.

Aromatic polyesters which are particularly well suited for film-forming and molding applications may also be prepared by reacting an organic diacid halide with a difunctional aliphatic reactive modifier, such as a glycol, and subsequently reacting this product with a bisphenol compound. The resulting polyesters have reduced melt viscosities and melting points which permits molding at temperatures within the operable limits of conventional molding appartus (i.e. less than about 300° C.). This type of glycol-modified polyester is more fully disclosed in U.S. Pat. No. 3,471,441, to Hindersinn et al.

In order to form a successful molding resin on a commercial scale, a polymer should be capable of being molded conveniently without significant degradation in physical properties. In this respect, although the aforementioned aromatic polyesters generally display excellent physical and chemical properties, a persistent and troublesome problem has been their sensitivity to hydrolytic degradation at elevated temperatures. This sensitivity to the combined effects of heat and moisture is also exhibited in commercially available polycarbonate resins as evidenced by the desirability of reducing the water content of the resin to less than about 0.05% prior to molding. Unfortunately, however, the aromatic polyester resins often display a more pronounced tendency to rapidly degrade and embrittle than do polycarbonate resins. This is demonstrated by the loss in a polymer property, e.g. tensile strength, which can occur when an aromatic polyester resin is molded and subsequently immersed in boiling water. This tendency may be explained, in part, by the hydrolysis of the ester linkages under these conditions. In any event, it is to be appreciated that sensitivity to moisture represents a significant problem in aromatic polyester resins that would significantly limit their commercial utility in applications such as in autoclaves or at elevated temperatures in humid atmospheres.

In addition to the aforementioned problem of hydrolytic stability, the linear aromatic polyesters have relatively poor bending flexibility, i.e. films of the polyester readily crack on repeated bending.

It is known that the linear aromatic polysulfonates have relatively poor hydrolytic stability compared to polyesters of carboxylic acids (Encyclopedia of Polymer Science and Technology, Interscience Vol. 11, 1969, pg. 77 and P. W. Morgan "Condensation Polymers" Interscience Publishers, 1965, p. 384). Accordingly, addition thereof to a linear aromatic polyester would not be considered as a likely method of improving the hydrolytic stability of the latter polyester. Therefore, it was surprising and unexpected to find in accordance with this invention that polyblends of the aromatic polyesters and aromatic polysulfonates have enhanced hydrolytic stability. It is noted that U.S. Pat. No. 3,262,914 (to E. P. Goldberg et al) teaches that a copolyester containing the monomer residue of a bisphenol together with an aromatic dicarboxylic acid residue and an aromatic disulfonic acid residue has good resistance to hydrolysis by aqueous ammonia, caustic, and mineral acid. In the patent, the method of determination of hydrolytic stability is by weight loss after contact with the aqueous corrosive reagent. As pointed out below, this technique is less appropriate for measurement of hydrolytic stability than measurement of loss of intrinsic viscosity by the polymer on immersion in water of neutral pH, which is the method employed to measure hydrolytic stability in the present invention.

Accordingly, it is a principal object of this invention to prepare aromatic polyester compositions having enhanced hydrolytic stability and flexibility as well as other excellent chemical and physical properties.

SUMMARY OF THE INVENTION

According to the invention thermoplastic molding and film-forming compositions having improved hydrolytic stability and flexibility comprise solid solution polyblends of (a) a linear aromatic polyester of a bisphenol and a dicarboxylic acid and (b) a linear aromatic polysulfonate of a bisphenol and a disulfonic acid.

The linear aromatic polyester (a) is a linear aromatic carboxylate polyester, i.e. all of the acid monomer residues of the polyester are derived from polycarboxylic acids.

It has been found in accordance with the present invention that the present linear aromatic polyester and the linear aromatic polysulfonate are compatible, i.e. mutually soluble in each other in the solid state, and, hence, capable of forming a solid solution polyblend under appropriate blending conditions. The compatibility in the polyblend of the two component polymeric substances is demonstrated by the substantial transparency to light of the present polyblend and by the single value of the glass transition temperature determined for the polyblend.

The present polyblend is characterized by a synergistic enhancement (with respect to each of its polymeric components) in hydrolytic stability and in flexibility on bending while retaining in general the excellent electrical and mechanical properties of the linear carboxylate aromatic polyester.

DESCRIPTION OF THE PREFERRED EMBODIMENTS

Preparation of Linear Aromatic Polyester

The linear aromatic polyesters of the present invention can be prepared by condensing a diacid halide of a dicarboxylic acid, dissolved in an organic liquid which is a solvent for the polyester to be formed, with a metal phenolate of a bisphenol, dissolved in a liquid which is immiscible with the solvent for the diacid halide. This process is more fully described in U.S. Pat. No. 3,216,970, to Conix, the disclosure of which is incorporated herein by reference.

The bisphenols which can be used in this process are known in the art and correspond to the general formula:

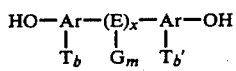

wherein Ar is aromatic, preferably containing 6–8 carbon atoms (including phenyl, biphenyl and naphthyl); G is alkyl, haloalkyl, aryl, haloaryl, alkylaryl, haloalkyaryl, arylalkyl, haloarylalkyl, cycloalkyl, or halocycloalkyl; E is a divalent (or di-substituted) alkylene, haloalkylene, cycloalkylene, halocycloalkylene, arylene, or haloarylene, —O—, —S—, —SO—, —SO$_2$—, —SO$_3$—, —CO—, GP=O or GN<; T and T' are independently selected from the group consisting of halogen, such as chlorine or bromine, G and OG; m is an integer from 0 to the number of replaceable hydrogen atoms on E; b is an integer from 0 to the number of replaceable hydrogen atoms on Ar, and x is 0 or 1. When there is plurality of G substituents in the bisphenols, such substituents may be the same or different. The T and T' substituents may occur in the ortho, meta or para-positions with respect to the hydroxyl radical. The foregoing hydrocarbon radicals preferably have carbon atoms as follows:

alkyl, haloalkyl, alkylene and haloalkylene of 1 to 14 carbons; aryl, haloaryl, arylene and haloarylene of 6 to 14 carbons; alkylaryl, haloalkylaryl, arylalkyl and haloarylalkyl of 7 to 14 carbons; and cycloalkyl, halocycloalkyl, cycloalkylene and halocycloalkylene of 4 to 14 carbons. Additionally, mixtures of the above described bisphenols may be employed to obtain a polymer with especially desired properties. The bisphenols generally contain 12 to about 30 carbon atoms, and preferably 12 to about 25 carbon atoms.

Typical examples of bisphenols having the foregoing formula include bis(4-hydroxyphenyl)methane, bis(2-hydroxyphenyl)methane, (4-hydroxyphenyl-, 2-hydroxyphenyl)-methane, and mixtures thereof; bis(4-hydroxy-3,5-dichlorophenyl)methane, bis(4-hydroxy-3,5-dibromophenyl)methane, bis(4-hydroxy-3,5-difluorophenyl)methane, bisphenol-A [bis(4-hydroxyphenyl)-2,2-propane], bis-(4-hydroxy-3,5-dichlorophenyl)-2,2-propane, bis(3-chloro-4-hydroxyphenyl)-2,2-propane, bis(4-hydroxynaphthyl)-2,2-propane, bis(4-hydroxynaphthyl)-2,2-propane, bis(4-hydroxyphenyl)-phenyl methane, bis(4-hydroxyphenyl) diphenyl methane, bis(4-hydroxyphenyl)-4'-methyl phenyl methane, bis(4-hydroxyphenyl)-4'-chlorophenyl methane, bis(4-hydroxyphenyl)-2,2,2-trichloro-1,1,2-ethane, bis(4-hydroxyphenyl)-1,1-cyclohexane, bis(4-hydroxyphenyl)cyclohexyl methane, 4,4-dihydroxyphenyl, 2,2'-dihydroxydiphenyl, dihydroxynaphthalenes, bis-(4-hydroxyphenyl)-2,2-butane, bis(2,6-dichloro-4-hydroxyphenyl)-2,2-propane, bis(2-methyl-4-hydroxyphenyl)-2,2-propane, bis(3-methyl-4-hydroxyphenyl)-1,1-cyclohexane, bis(2-hydroxy-4-methylphenyl)-1,1-butane, bis(2-hydroxy-4-tertiary butylphenyl)-2,2-propane, bis(4-hydroxyphenyl)-1-phenyl-1,1-ethane, 4,4'-dihydroxy-b 3-methyl diphenyl-2,2-propane, 4,4'-dihydroxy-3-methyl-3'-isopropyl diphenyl-2,2-butane, bis(4-hydroxyphenyl)sulfide, bis-(4-hydroxyphenyl)ketone, bis(4-hydroxyphenyl)oxide, bis(4-hydroxyphenyl)sulfone, bis(4-hydroxyphenyl)sulfoxide, bis(4-hydroxyphenyl)sulfonate, bis(4-hydroxyphenyl)amine, bis(4-hydroxyphenyl)phenyl phosphine oxide. 2,2-bis(3-chloro-4-hydroxyphenyl)propane, 4,4'-(cyclomethylene) bis-(2,6-dichlorophenol; 2,2-bis-(3,5-dichloro-4-hydroxyphenyl)-propane, 2,2-bis-3,5-dibromo-4-hydroxyphenyl)-propane, 1,1-bis-(3,5-dichloro-4-hydroxyphenyl)-1-phenylethane, 2,2-bis-(3,5-dibromo-4-hydroxyphenyl-hexane, 4,4'-dihydroxy-3,3',5,5'-tetrachlorodiphenyl, 2,2-bis-(3-chloro-4-hydroxyphenyl)-propane, 2,2-bis-(3,5-dibromo-4-hydroxyphenyl)-propane, 2,2-bis-(3,5-dichloro-4-hydroxyphenyl)-propane, tetra-chlorodiphenylolsulfone, bis(3,5-dibromo-4-hydroxyphenyl)-phenyl phosphine oxide, bis(3,5-dibromo-4-hydroxyphenyl)sulfoxide, bis(3,5-dibromo-4-hydroxyphenyl)sulfone, bis(3,5-dibromo-4-hydroxyphenyl)-sulfonate, bis(3,5-dibromo-4-hydroxyphenyl)-sulfide, bis(3,5-dibromo-4-hydroxyphenyl)-amine, bis(3,5-dibromo-4-hydroxyphenyl)-ketone, and 2,3,5,6,2',3',5',6',-octachloro-4-4'-dihydroxy biphenyl. Representative biphenols are o,o'-biphenol, m,m'-biphenol; p,p'-biphenol; bicresols, such as 4,4'-bi-o-cresol, 6,6'-bi-o-cresol, 4,4'-bi-m-cresol; dibenzyl biphenols such as a,a'-diphenol-4,4'-bi-o-cresol; diethyl biphenols such as 2,2'-diethyl-p,p'-biphenol, and 5,5'-diethyl-o,o'-biphenol; dipropyl biphenols such as 5,5'-diethyl-o,o'-biphenol and 2,2'-diisopropyl-p,p'-biphenol; diallyl biphenols such as 2,2'-diallyl-p,p'-biphenol; and dihalobiphenols, such as 4,4'-dibromo-o,o'-biphenol. Mixtures of isomers of the foregoing bisphenols can be used.

The dicarboxylic acids which are useful in this process are also well known and are represented by the formula:

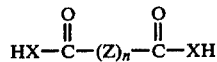

in which X is oxygen or sulfur, Z is alkylene, —Ar— or —Ar—Y—Ar— where Ar has the same definition as given with respect to the bisphenols Y is a alkylene, of 1 to 10 carbons, haloalkylene, —O—, —S—, —SO—, —SO$_2$—, —SO$_3$—, —CO—,

or GN<; and n is 0 or 1.

Suitable dicarboxylic acids include aromatic dicarboxylic acids such as phthalic acid, isophthalic acid, terephthalic acid, bis(4-carboxyl)-diphenyl, bis(4-carboxyphenyl)-ether, bis(4-carboxyphenyl)-sulfone, bis(4-carboxyphenyl)-carbonyl, bis(4-carboxyphenyl)-methane, bis(4carboxyphenyl)-dichloromethane, 1,2- and 1, 1-bis(4-carboxyphenyl)-ethane, 1,2- and 2,2-bis(4-carboxyphenyl)-propane, 1,2-and 2,2-bis(3-carboxyphenyl)-propane, 2,2-bis(4-carboxyphenyl)-1,1-dimethyl propane, 1,1- and 2,2-bis(4-carboxyphenyl)-butane, 1,1- and 2,2-bis(4-carboxyphenyl)-pentane, 3,3-bis(4-carboxyphenyl)-heptane, 2,2-bis(4-carboxyphenyl)-heptane, and aliphatic acids such as oxalic acid, adipic acid, succinic acid, malonic acid, sebacic acid, glutaric acid, azelaic acid, suberic acid and the like.

The preferred aromatic polyesters of this invention are prepared from bisphenols and at least one aromatic dicarboxylic acid, most preferably selected from the group consisting of isophthalic acid, terephthalic acid, or mixtures thereof. Isophthalic acid and terephthalic acid are preferred due to their availability and low cost. Most preferably, the dicarboxylic acid component comprises a mixture of about 75 to about 100 mol percent isophthalic acid and about 25 to about 0 mole percent terephthalic acid.

When the dicarboxylic acids used in preparing a polyester of the invention consist of both isophthalic and terephthalic acids in accordance with an especially preferred embodiment of the invention, a weight proportion of isophthalic to terephthalic acid residues in the polyester ranging from about 75:25 to about 90:10 provides an especially satisfactory result.

An alternate process for preparing suitable aromatic polyesters, disclosed in U.S. Pat. No. 3,471,441, to Hindersinn et al., the disclosure of which is incorporated herein by reference, comprises the homogeneous reaction of an aliphatic modifier, preferably a glycol of 2 to about 100 carbon atoms, with a diacid halide of a dicarboxylic acid, followed by an interfacial polymerization of the resultant prepolymer with a bisphenol. Compositions prepared by this process have an aliphatic modifier, i.e. a glycol, incorporated into the structure of the reaction product of the bisphenol and diacid halide, and possess excellent engineering properties such as high impact strength, high modulus, improved moldability, and high softening points.

The bisphenol and dicarboxylic acid components which may be employed in the Hindersinn et al. preparatory process correspond to those described above. The aliphatic modifier is a reactive difunctional component which may be represented by the formula:

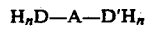

$H_nD—A—D'H_n$ wherein D and D' are independently selected from the group consisting of O, S, and N; A is a bivalent or disubstituted aliphatic radical, free of tertiary carbon atoms, selected from the group consisting of alkylene, cycloalkylene, arylalkylene, alkyleneoxyalkyl, poly(alkyleneoxy)alkyl, alkylene-carboxyalkylene-carboxyalkyl, and poly(alkylene carboxyalkylene-carboxy)alkyl; and n is an integer from 1 to 2 with n being 2 when D and D' is N. Typical examples of aliphatic modifiers having the foregoing formula include ethylene glycol, diethylene glycol, neopentyl glycol, 1,4-cyclohexane, dimethanol, 1,4-butane dithiol, dipropylene glycol, polypropylene glycol, 1,1-isopropylidene bis(p-phenyleneoxy)di-2-ethanol, 2,2,4,4-tetramethyl-1,3-cyclobutanediol, bis(4-hydroxycyclohexane)-2,2-propane, di(hydroxyethyl)adipate, di(hydroxypropyl)glutarate, di(hydroxyethyl) poly(ethylene glycol)adipate, ethane dithiol, ethanolamine, methylethanolamine, hexamethylenediamine, 1,3-propanediol, 2-mercaptoethanol, and 2-aminopropanethiol. Combinations of the above-described aliphatic modifiers can also be employed, usually to obtain special properties.

Solution processes can also be employed in the preparation of suitable aromatic polyesters, such as disclosed in U.S. Pat. Nos. 4,051,107 and 4,051,106, the disclosures of which are incorporated herein by reference.

The polyester components of the invention are preferably prepared by a process, described as melt polymerization, involving an ester interchange, i.e. transesterification reaction, between a diphenolic reactant and a diaryl ester of a dicarboxylic acid carried out in the melt (i.e. without use of a reaction solvent or diluent). Such a process is described in British Pat. No. 924,607, to Imperial Chemical Industries Limited, the disclosure of which is incorporated herein by reference.

A further melt polymerization process which can be used to prepare linear aromatic polyesters suitable for use in this invention is described and claimed in copending application Ser. No. 818,493, filed July 25, 1977, now U.S. Pat. No. 4,137,278 as a continuation-in-part of application Ser. No. 542,635, filed Jan. 20, 1975, now abandoned. This process basically comprises first mixing a bisphenol, a diaryl ester of a carboxylic acid and a diol, and then reacting the resulting mixture in the presence of a transesterification catalyst. The disclosure of this application is incorporated herein by reference.

PREPARATION OF LINEAR AROMATIC POLYSULFONATE

The bisphenol polysulfonate component of the present solid solution polyblend comprises as monomer units the residue of a bisphenol of the aforementioned structural formula and the residue of one or more disulfonic acids of the following general formula:

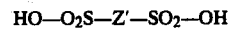

$HO—O_2S—Z'—SO_2—OH$ wherein Z' is alkylene or cycloalkylene of 1 to 6 carbon atoms, —Ar— or —Ar—Y'—Ar— where Ar has the same definition as given with respect to the bisphenols, Y' is alkylene, haloalkylene, —O—, —S—, —SO$_2$—, —CO—, and GN<; wherein G is alkyl, haloalkyl, aryl, haloaryl, alkylaryl, haloalkylaryl, arylalkyl, haloarylalkyl, cycloalkyl or cyclohaloalkyl, as defined above, said alkyl and haloalkyl groups preferably containing 1 to 6 carbon atoms.

As illustrative of disulfonic acids corresponding to the disulfonate residues of the present sulfonate polymer components of the invention, the following representative examples may be cited: methane disulfonic acid, 1,3-propane disulfonic acid, 1,4-cyclohexane disulfonic acid, 1,2-ethane disulfonic acid, 1,3-cyclopentane disulfonic acid, 1,3-isopropyl disulfonic acid, 1,6-n-hexane disulfonic acid, 1,4-, 1,3- and 1,2-benzene disulfonic acids, 2,4-toluene disulfonic acid, 2,7-naphthalene disulfonic acid, 4,4'-diphenyl disulfonic acid, 4,4'-diphenylether disulfonic acid, 4,4'-diphenyl methane disulfonic acid, 3,3'- and 4,4'-diphenyl sulfone disulfonic acids, 2,2'-bis(4-hydroxysulfonyl phenyl)-propane, 4,5- and 4,6-dichloro-1,3-benzene disulfonic acids, 4,5,6-trichloro 1,3-benzene disulfonic acid, 4,4'-diphenyl sulfide disulfonic acid, 4,4'-diphenyl ketone, disulfonic acid, N-(n-hexyl)N,N-bis(4-phenyl sulfonic acid)amine, N-phenyl, N,Nbis(3-phenyl sulfonic acid)amine, N-(p-tolyl)N,N-bis(4-phenyl sulfonic acid)amine, N-(p-chlorophenyl)N,N-bis(4-phenyl sulfonic acid)amine, N-(p-chlorobenzyl)-N,N-bis(4phenyl sulfonic acid) amine, N-(p-chloromethylphenyl)N,N-bis-(3-phenyl sulfonic acid) amine, N-(3-chloropropyl)N,N-bis(3-phenyl sulfonic acid)amine, N-(cyclohexyl)N,N-bis(4-phenyl sulfonic acid)amine, and N-(4-chlorocyclohexyl)N,N-bis(4-phenyl sulfonic acid)amine.

The present polysulfonates can be prepared by reaction of the di-acid halide, e.g. the diacid chloride or diacid bromide, of the disulfonic acid and the bisphenol by techniques which are analogous to those employed in preparing the linear carboxylate aromatic polyesters as described above. Reaction of the diacid halide of an aromatic disulfonic acid with bisphenol compound to prepare bisphenol disulfonate polymers is disclosed by U.S. Pat. No. 3,505,289 to Conix et al., by U.S. Pat. No. 3,658,757 to Conix et al., and by D. W. Thomson et al., J. Polymer Science, Part A, Vol. 2, pgs. 1054–1056, the disclosures of which are incorporated herein by reference. Reaction of a diacid halide of an aliphatic or cycloaliphatic disulfonic acid with a bisphenol disulfonate polymer is disclosed by H. Distler et al. German Pat. No. 1,108,916 (1964), the subject matter of which is incorporated by reference. Preferably the bisphenol disulfonate polymers of the invention contain exclusively residues of aromatic disulfonic acids.

In general, the weight ratio of the linear aromatic polyester to the linear aromatic polysulfonate polymer constituents in the present polyblend can be varied over a wide range in accordance with the invention. In general, the weight ratio of carboxylate polyesters to aromatic polysulfonate is about 5:95 to 95:5 and preferably is about 30:70 to about 70:30.

PREPARATION OF THE POLYBLEND

The polyblends of the invention are prepared from mere blends or physical mixtures of the component polyester and polysulfonate employing sufficiently intensive mixing conditions to obtain a solid solution polyblend.

The term polyblend has been used by some authors to be inclusive of mere physical aggregations of the component polymeric substances (obtainable for example by tumbling of the component polymers at ambient temperature) as indicated by the definition of polyblend in "The Condensed Chemical Dictionary", Van Nostrand Rheinhold Company, Ninth Edition, 1977, p. 696. The polymeric components of such physical aggregates, although they may constitute homogeneous mixtures on the basis of elemental composition, are capable of being separated by simple mechanical means, e.g. manually by a tweezers. Each component of the aggregate exhibits its properties separately so that the aggregate does not have a definite value for any individual property.

According to a second, narrower current definition, the term polyblend designates a blend of polymers which is incapable of being separated by a simple mechanical operation of the foregoing type, i.e. a blend prepared by (a) mechanical blending in the molten state using roll mills or extruders, known as melt blending, (b) mixing in a common solvent or (c) mixing in a latex state as defined in "The Encyclopedia of Polymer Science and Technology", Interscience, Supplement Vol. 2, 1977, pgs. 405–406 and 458–484, the subject matter of which is incorporated herein by reference. Polyblends of the latter type possess a unique set of property values different from the property values of the individual component polymers.

When the polymers being blended are substantially compatible, i.e. mutually soluble in each other in the solid state, and sufficiently intensive mixing conditions are employed in accordance with the latter three blending methods (for example in melt blending by employing sufficient mixing time and mixing energy for complete interdiffusion of the large, slow diffusing molecules of the polymeric constituents at the elevated mixing temperature required to melt the polymers) there is obtained a solid solution polyblend characterized by a single value of the glass transition temperature and substantial transparency to light.

The present polyblends, which are solid solution polyblends of the latter type, are preferably obtained by melt blending wherein sufficiently intensive mixing corresponding to a high shear mixing condition and a sufficient long mixing time of at least about one minute, preferably at least about 1.5 minutes, are provided to insure complete inter-diffusion of the polymeric constituents of the blend under a sufficiently elevated temperature (e.g. at about 450° F. or higher, where one polyester component employed is devoid of an aliphatic modifier, at about 420° F. or higher where an aliphatic modifier-containing polyester is employed) to melt the polymeric constituents.

The preparation of the present solid solution polyblends can be carried out in an injection molding machine, roll mixer, screw extruder or preferably a rotary mixer capable of providing a high shear mixing condition at a temperature required to melt the linear carboxylate aromatic polyester and the linear aromatic sulfonate.

OPTIONAL ADDITIVES

The thermoplastic compositions of the invention may optionally contain minor amounts, e.g. of about 1 to 30 weight percent based on the weight of composition, of additional polymer additives which are copolyblended with the polyblend of the invention. Typical optional polymer additives suitable for polyblending with the present polyblend include polyalkylene terephthalates such as polyethylene and polybutylene terephthalate, hexamethylene polyadipamide, polyepsilon-caprolactam, polyphenylene sulfide, (as described in copending U.S. application Ser. No. 905,623, filed May 12, 1978 now abandoned, but refiled as Ser. No. 154,176, now U.S. Pat. No. 4,284,549, the disclosure of which is incorporated herein by reference), homopolymers of lower alkyl esters of acrylic and methacrylic acids and the rubber-modified styrene maleic anhydride polymer described in copending U.S. application Ser. No. 863,553, filed Dec. 22, 1977, now U.S. Pat. No. 4,126,602, the disclosure of which is incorporated herein by reference.

The thermoplastic compositions of the present invention may also include various additives such as flame retardants, organic or inorganic fillers, stabilizers, and antistatic agents.

As flame retardants there can be used the halogen-containing flame retardant agents disclosed in U.S. application Ser. No. 863,556, filed Dec. 22, 1977, now U.S. Pat. No. 4,211,687. Alternatively, a halogen-containing bisphenol-dicarboxylic acid linear aromatic polyester as described to U.S. application Ser. No. 863,381 also filed on Dec. 22, 1977, now U.S. Pat. No. 4,251,429 can be employed as an additive to enhance the flame retardance of the present compositions. As an additional alternative a portion of the bisphenol in the present linear aromatic polyester and/or in the present sulfonate polymer can be a halogen-substituted bisphenol in order to enhance flame retardance in the present composition.

The disclosures of the latter two applications are incorporated herein by reference.

The fillers which may be employed in the invention are preferably particulate fillers such as particulate glass (e.g. chopped glass fiber, glass rovings, glass microballoons or microspheres and pulverulent glass) particulate clay, talc, mica, inorganic natural fibers, synthetic organic fibers, alumina, graphite, silica, calcium carbonate, carbon black, magnesia and the like. Generally such fillers are added to reinforce the structural integrity of a polymer, e.g. to inhibit sagging and/or to improve the tensile strength and stiffness of the polymer composition and also to reduce shrinkage, minimize crazing, lower material costs, impart color or opacity, and improve the surface finish of the polymer composition. Generally the amount of particulate filler employed in the compositions of the invention is in the range of about 5 to about 70 weight percent, preferably about 5 to about 40 weight percent and especially about 8 to about 30 weight percent based on the combined weight of the polyester and the sulfonate polymer. The filler employed preferably is inorganic and more preferably is particulate glass and especially is glass fiber.

When the filler employed is particulate glass and especially is glass fiber, it is preferred that an organic coupling agent be present as a very thin coating on the glass particles. The coupling agent, which is preferably an organic silane, forms an adhesive bridge between the glass and the polymer blend thereby enhancing the strength properties of the filled polymer blend. Suitable coupling agents which can be employed with glass filler in the thermoplastic resin compositions of the invention are more particularly described in the aforementioned copending application Ser. No. 905,623, filed May 12, 1978.

The additive-containing resin mixture of the invention may be prepared, if desired, by charging the additive to the polyblend formation step or mixing or blending the additive with the previously prepared polyblend in molten condition. The resultant additive-containing composition can then be processed to a film in a press or be molded directly in an injection molding apparatus or an extruder. The films and molded articles thus formed have excellent hydrolytic stability and flexibility.

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts and percentages are by weight.

EXAMPLE 1

(Preparation of a Bisphenol A-Isophthalate-Terephthalate-4,4'-Diphenyl Disulfonate Copolyester)

As basis for a control experiment described in Example 6 below there is prepared a bisphenol A-isophthalate-terephthalate-4,4'-diphenyl disulfonate copolyester. Bisphenol A (45.67 g., 0.2 mole), 4,4'-diphenyl disulfonyl chloride (28.09 g., 0.08 mole) which is prepared substantially as described in Bailey Ed., *Macromolecular Synthesis*, 4 60(1972), isophthaloyl chloride (12.8 g., 0.06 mole), terephthaloyl chloride (12.18 g., 0.06 mole) and methylene chloride solvent (500 ml.) are charged to a Morton flask equipped with a thermometer and nitrogen inlet. The reactants are maintained under a blanket of dry nitrogen.

Over a period of 1.1 hours there is added gradually to the agitated reaction mixture through an addition funnel freshly distilled triethyl amine (48.5 g., 0.48 mole) as hydrogen-chloride-accepting catalyst. During the addition the temperature of the reaction mixture is maintained at 20°–25° by cooling the reaction mixture in a cooling bath. After completion of the addition, the reaction mixture is agitated overnight. The reaction mixture is then transferred to separatory flask equipped with agitation means. Distilled water (500 ml.) containing concentrated aqueous hydrochloric acid is added to the agitated mixture which is then allowed to stratify into an aqueous layer and an organic layer. After separation of the aqueous layer, the organic layer containing the product is washed with distilled water until the effluent wash water is free of chloride ion as determined by failure of a sample of the effluent wash water to give a precipitate of silver chloride or treatment with aqueous silver nitrate. The resultant methylene chloride solution of copolyester product is filtered through a sintered glass filter funnel. The copolyester product is recovered by adding the solution gradually to hot stirred water in a blender. The product which precipitates from the agitated aqueous mass is collected by filtration and dried on Teflon coated pan in a vacuum oven at 100° for several hours. There is thus obtained a copolyester of bisphenol A, isophthalic acid, terephthalic acid and 4,4'-diphenyl disulfonic acid (containing about 50 mole percent bisphenol A monomer residue, about 25 mole precent 4,4'-diphenyl disulfonate groups, about 12.5 mole percent isophthalate groups and about 12.5 mole percent terephthalate groups) which has an intrinsic viscosity of about 0.66 dl./g. as measured in symmetrical tetrachloroethane at 30°.

EXAMPLE 2

(Preparation of Bisphenol A-4,4'-Diphenyl Disulfonate Polysulfonate)

The procedure of Example 1 above is followed substantially as described to prepare a polysulfonate ester homopolymer except that there are employed as reactants bisphenol A (45.67 g., 0.2 mole) and 4,4'-diphenyl disulfonyl chloride (70.22 g., 0.2 mole) and addition of acetone is used to precipitate the polymer from the washed, filtered methylene chloride solution. There is thus obtained a bisphenol A-4,4'-diphenyl disulfonate polymer which contains about 50% bisphenol A monomer residues and about 50% 4,4'-diphenyl disulfonate groups. The poly-sulfonate has an intrinsic viscosity of about 0.63 dl./g. (determined as described in Example 1 above) and a mean glass transition temperature of 176°.

EXAMPLE 3

(Preparation of a Bisphenol A-Isophthalate-Terephthalate Polyester By Solution Polymerization)

The procedure of Example 1 is repeated substantially as described in Example 1 except that 95.0 moles of bisphenol A, 72.0 moles of isophthaloyl chloride, and 24.0 moles of terephthaloyl chloride are employed as the reactants with 2 moles (about 1 mole percent based on the moles of the reactants) of para-tertiary butyl phenol being employed as a reaction mixture viscosity control agent and 197.76 moles (about 10.4 mole percent based on the moles of the reactants) of the triethyl amine polyesterification catalyst. The polyesterification is carried out at a reaction temperature of 25°–32° for about 4.5 hours. Addition of isopropyl alcohol to the washed and filtered methylene chloride product-containing solution is employed to precipitate the product which is otherwise recovered and dried substantially as described in Example 1.

There is thus obtained a bisphenol A-isophthalate-terephthalate carboxylate polyester containing 49.5 mole percent of bisphenol A monomer residues, 37.5 mole percent of isophthalate groups, 12.5 mole percent terephthalate groups and about 0.5 mole percent of tertiary butyl phenyl groups derived from the viscosity control agent. Since the latter constituent is present in an essentially negligible proportion, the polymer is considered to be a polymer of bisphenol A monomer residues, isophthalate groups, and terephthalate groups in the molar ratio of 1:0.75:0.25.

The polymer product has an intrinsic viscosity of about 0.63 dl./g. (determined as in Example 1) and a mean glass transition temperature of 185°.

EXAMPLE 4

(Preparation of a Bisphenol A-Isophthalate-Terephthalate Polyester By Melt (transesterification) Polymerization)

Bisphenol A (1319.1 g.), diphenyl terephthalate (275.9 g.) and diphenyl isophthalate (1562.9) are dried for several hours at 75° in a vacuum oven and charged with 0.07 g. of anhydrous lithium hydroxide transesterification catalyst to a 5-liter resin kettle under nitrogen. The kettle is equipped with a thermometer, a nitrogen inlet on a Y-tube, a mechanical stirrer, a short Vigreaux column, a distillation head and 3 necked flask receiver.

The kettle is heated to 210° to melt the reactants and vacuum is applied gradually to the stirred molten mass. The temperature of the reaction mass is increased gradually to remove phenol overhead to the receiver. After 1.4 hours the temperature of the reaction mass reaches 228° and the reaction mass pressure is about 0.5 mm Hg. The reaction mass is then flooded with dry nitrogen to relieve the vacuum and the viscous reaction mass is poured into a foil-lined glass tray and allowed to cool to ambient temperature.

The bisphenol A-isophthalate-terephthalate prepolymer thus obtained is broken up and dried overnight at 70° in a vacuum oven. The dried prepolymer (1070 g.) is charged to a two gallon oil-heated stainless steel reactor equipped with agitation means under dry nitrogen and heated with agitation to 210°. Agitation of the molten mass is commenced after 1 hour. After 1.3 hours from the commencement of heating, vacuum (about 0.6 mm of Hg.) is applied to the agitated mass. The reaction temperature is raised gradually over a period of about 2 hours to 305°. The agitated reaction mass is then maintained under vacuum at 305° for 6.7 hours. The reactor is opened and the polyester obtained is discharged from the reactor and allowed to cool to ambient temperature. A clear yellow bisphenol A-isophthalate-terephthalate polyester having a relative viscosity of 1.36 (measured in symmetrical tetrachloroethane at 30°) is obtained.

In order to prepare additional quantities of the product, the foregoing procedure was repeated with 1100 g. of prepolymer being employed in the polymerization reaction. A similar polymer was obtained having a relative viscosity of 1.35 (measured in symmetrical tetrachloroethane at 30°).

The resultant product is a polyester of bisphenol-A monomer residues, isophthalate groups and terephthalate groups in a molar proportion of about 1:0.85:0.15.

EXAMPLE 5

(Preparation of Polyblend of a Bisphenol Aromatic Polyester and a Bisphenol Aromatic Polysulfonate)

A polyblend is prepared from a mixture of 20.2 g. of the bisphenol A-4,4'-diphenyl disulfonate polysulfonate of Example 2 and 21.4 g. of the bisphenol A-isophthalate-terephthalate polyester of Example 3 by charging the mixture to a Rheomix 620 roto-type mixer wherein a sufficiently elevated temperature (450° F.) is provided to melt the polymer constituents. The mixer is operated under conditions of high shear mixing corresponding to a rotor speed of 60 r.p.m. The blending operation is carried out for 2 to 3 minutes to insure complete interdiffusion of the molten polymer constituents so as to obtain a solid solution polyblend of the bisphenol A-isophthalate-terephthalate polyester and the bisphenol A-4,4'-diphenyl disulfonate polysulfonate.

The polyblend product is compressed into pellets in a piston-equipped cylinder. After being dried overnight in vacuo at 110°, the pellets are converted into circular films of 25 mil thickness which are substantially transparent by pressing in a Carver Press at 520° F. at 10,000–12,000 psig for 2–3 minutes.

The polyblend product has about the same stoichiometry as the bisphenol A-isophthalate-terephthalate-4,4'-diphenyl disulfonate copolyester of Example 1, i.e. contains about the same molar proportions of bisphenol A, monomer residues, isophthalate groups, terephthalate groups and 4,4'-diphenyl disulfonate groups.

The compatibility of the polyester constituent and the polysulfonate constituent of the polyblend is indicated by the substantial transparency of the polyblend and by single glass transition temperature determined for the polyblend, i.e. the polyblend has a single mean glass transition temperature of 175°.

The intrinsic viscosity of the polyblend film (i.e. the intrinsic viscosity of the processed polyblend) is 0.63 dl./g. determined as described in Example 1.

EXAMPLE 6

(Comparative Testing of Hydrolytic Stability of the Polyblend)

Polyblend film samples prepared as described in Example 5 are immersed for three weeks in a bath of distilled water, i.e. water of substantially neutral pH, boiling under reflux conditions. After one week a portion of the film the samples are raised from the bath and dried, and the intrinsic viscosity of the film samples are measured (substantially as described in Example 1). The loss in intrinsic viscosity of the film after boiling water immersion is determined by comparing the latter intrinsic viscosity with the original intrinsic viscosity of the film. The foregoing testing procedure is repeated on the remaining film samples after two weeks immersion and also after three weeks immersion.

The foregoing procedure is repeated substantially as described for polymer films of the polymer products of Examples 1, 2, and 3 (said films being prepared at the same thickness as those of Example 5 by the pelletizing and pressing techniques described in Example 5 The results of the hydrolytic stability tests are presented in Table I below.

TABLE I

| POLYMER TESTED | INTRINSIC VISCOSITY (dl./g.) | | | | | Loss (dl./g.) in Intrinsic Viscosity of Polymer on Water Immersion | | | Percent Loss in Intrinsic Viscosity of Polymer on Water Immersion (Based on Intrinsic Viscosity of Polymer Film Prior to Immersion) | | |
|---|---|---|---|---|---|---|---|---|---|---|---|
| | Of Unprocessed Polymer | Of Polymer Processed As Film Before Water Immersion | Of Polymer Processed As Film After Water Immersion | | | | | | | | |
| | | | For 1 Wk. | For 2 Wks. | For 3 Wks. | After 1 Wk. | After 2 Wks. | After 3 Wks. | After 1 Wk. | After 2 Wks. | After 3 Wks. |
| (a) Bisphenol A-isophthalate-terephthalate polyester of Example 3 | 0.63 | 0.56 | 0.45 | 0.37 | 0.28 | 0.11 | 0.19 | 0.28 | 20% | 34% | 50% |
| (b) Bisphenol A-4,4'-diphenyl disulfonate polysulfonate of Example 2 | 0.73 | 0.70 | 0.69 | 0.69 | 0.69 | 0.01 | 0.01 | 0.01 | 1.4% | 1.4% | 1.4% |
| (c) Bisphenol A-isophthalate-terephthalate-4,4'-diphenyl disulfonate copolyester of Example 1 | 0.66 | 0.61 | 0.47 | 0.43 | 0.38 | 0.14 | 0.18 | 0.23 | 23% | 29.5% | 37.7% |
| (d) Polyblend of Example 5 (Containing the polymers of (a) and (b) as components) | 0.69* | 0.63 | 0.60 | 0.58 | 0.56 | 0.03 | 0.05 | 0.07 | 5% | 7.9% | 11.1% |

NOTE:
*The intrinsic Viscosity of the polyblend prior to processing as film is given as the arithmetic mean of the intrinsic viscosities of the constituent polymers based on their weight concentration in the polyblend.

The data presented in the foregoing Table indicates that on the basis of intrinsic viscosity loss on water immersion, the hydrolytic stability of the present solid solution polyblend is more than twice (i.e. more than 200% greater) than that expected for the polyblend on the basis of the intrinsic viscosity loss of each of the individual components of the polyblend. Thus, the bisphenol A-isophthalate-terephthalate polyester component of experiment (a) and the bisphenol A-4,4'-diphenyl disulfonate polysulfonate component of experiment (b) on boiling water immersion for three weeks exhibit intrinsic viscosity losses of 50% and 1.4%, respectively. Since the weight concentrations of polymer components (a) and (b) in the present polyblend of experiment (d) are 51.4% and 48.6% respectively, the intrinsic viscosity loss expected for the polyblend is calculated as (0.514) (50%)+(0.486) (1.4%) or about 26.4%. Since the measured loss (i.e. 11.1%) is less than the expected loss by a factor of about 2.4 or about 240%, the polyblend is characterized by a substantial synergistic enhancement of hydrolytic stability.

Comparison of the above tabulated data of experiment (c) relating to the hydrolytic stability of the copolyester of bisphenol A-isophthalate-terephthalate and 4,4'-diphenyl disulfonate groups and of experiment (d) relating to the hydrolytic stability of the polyblend (which contains substantially the same constituent groups in the same stoichiometric proportions as the copolyester) indicates that the hydrolytic stability of the polyblend in boiling water immersion for three weeks is about 3.4 times (i.e. about 340%) the hydrolytic stability of the copolyester under the same immersion conditions.

The foregoing determination of the hydrolytic stability of the present polyblend on the basis of intrinsic viscosity loss on immersion in boiling water of essentially neutral pH is seen to a more appropriate measurement of hydrolytic stability than, for example, measurement of polymer weight loss or immersion in an aqueous medium. This is so since the intrinsic viscosity of a linear polymer is a measure of the polymer molecular weight as indicated by F. W. Billmeyer, Jr., Ed. "Textbook of Polymer Science", Wiley Interscience Second Edition, 1971, Chapter 3 (Measurement of Molecular Weight and Size), Section D (Solution Viscosity and Molecular Size), the disclosure of which is incorporated herein by reference. Thus loss of intrinsic viscosity of a hydrolytically degraded polymer measures the molecular weight retention of the hydrolyzed polymer without involving as a factor the loss of degraded polymer fragments via solubilization in the aqueous medium (as does the polymer weight loss method).

Additionally, the use of a water bath of essentially neutral pH in the above described comparative tests of hydrolytic stability is seen to approach more closely actual polymer use conditions than, for example, use of baths of aqueous caustic, aqueous mineral acid or aqueous ammonia. This is so since in general use of polymeric substances the ambient moisture normally contacting the polymeric substances is generally of neutral pH.

EXAMPLE 7

(Comparative Testing of the Flexibility of the Polyblend)

The flexibility of the solid solution polyblend of the invention is measured by bending the circular film sample of 25 mil thickness of the polyblend, prepared as described in Example 5, 180° along the line of greatest diameter of the circular film sample (i.e. folding the circular film sample in half), opening folded circular film sample and bending, i.e. folding, the circular film sample along the same line or crease 180° in the opposite direction and repeating the above described bendings, i.e. foldings, until the first crack or cracks appear along said center crease. The number of bendings required to produce said cracking are reported in Table II below.

For comparative testing, comparable circular film samples of 25 mil thickness of the polymers of Examples 1, 2 and 3 prepared as described in Example 6 above are subjected to the bending test described above. The results of these comparative flexibility tests are compared to the flexibility test results of polyblend film sample in Table II below.

TABLE II

| POLYMERIC SUBSTANCE TESTED | NUMBER OF BENDINGS REQUIRED TO PRODUCE CRACKING AT THE CENTER CREASE OF THE CIRCULAR FILM SAMPLES |
|---|---|
| (a) Bisphenol A-isophthalate-terephthalate polyester of Example 3 | 4 |
| (b) Bisphenol A-4,4'-diphenyl disulfonate polysulfonate of Example 2 | 2 |
| (c) Bisphenol A-isophthalate-terephthalate-4,4'-diphenyl disulfonate-copolyester of Example 1 | 2 |
| (d) Polyblend of Example 5 (containing the polymers of (a) and (b) as components) | 5 |

From the data of Table II it is apparent that the present solid solution polyblend exhibits a synergistic enhancement of bending flexibility compared to the component polymers of the polyblend, i.e. the bisphenol A-isophthalate-terephthalate polyester and the bisphenol A-4,4'-diphenyl disulfonate polysulfonate. Thus the bisphenol A-isophthalate-terephthalate polyester of experiment (a) and the bisphenol-4,4'-diphenyl disulfonate polysulfonate of experiment (b) require 4 bendings and 2 bendings, respectively, to produce cracking. Since the weight concentration of polymer components (a) and (b) in the polyblend are 51.4% and 48.6%, respectively, the number of bendings expected to produce cracking for the polyblend sample is calculated as (0.514)(4)+(0.486)(2) or about 3.

The actual number of bendings of the polyblend sample required to produce cracking is 5 indicating that the flexibility of the polyblend is synergistically enhanced in flexibility compared to its component polymers by a factor of about 1.67.

Comparision of the above-tabulated data of experiment (c) relating to the flexibility of the copolyester of bisphenol A, isophthalate, terephthalate and 4,4'-diphenyl disulfonate and of experiment (d) relating to the flexibility of the polyblend (which contains substantially the same constituent groups in the same stoichiometric proportions as the copolyester) indicates that the bending flexibility of the present polyblend is about 2.5 times greater than the bending flexibility of the copolyester as determined by the present technique.

EXAMPLE 8

A mixture of bisphenol A-isophthalate-terephthalate polyester prepared by melt polymerization substantially as described in Example 4 above and the bisphenol A-4,4'-diphenyl disulfonate polysulfonate of Example 2 is converted to a solid solution polyblend employing proportions and blending techniques substantially as described in Example 5. An excellent solid solution polyblend substantially similar to that of Example 5 is obtained.

As will be evident to those skilled in the art, numerous variations and modifications can be made in the procedures of the foregoing Examples without departing from the spirit or scope of the invention.

For example instead of being pressed to a film at elevated temperature the aforementioned solid solution polyblend may be milled (for example in a conventional mill such as a Farrell Mill) at about the aforementioned elevated temperature and then extrusion molded, or preferably, injection molded in various shapes such as bars, rods, rings, and the like employing conditions essentially conventional in the art of thermoplastic polymers. If desired, a reinforcing filler such as glass fiber can be added to the composition delivered from the mill prior to the molding operation.

While this invention has been described with reference to certain specific embodiments, it will be recognized that many variations are possible, as illustrated above, without departing from the spirit and scope of the invention.

What is claimed is:

1. A thermoplastic polymeric composition comprising a solid solution polyblend of (a) a linear aromatic polyester of components comprising a bisphenol and a dicarboxylic acid and (b) a linear aromatic polysulfonate of components comprising a bisphenol and a disulfonic acid.

2. The composition of claim 1 wherein said dicarboxylic acid has the formula:

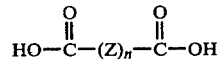

wherein Z is alkylene, —Ar— or —Ar—Y—Ar— where Ar is aromatic, Y is alkylene, haloalkylene, —O—, —S—, —SO$_2$—, —SO$_3$—, —CO—,

or GN<, wherein G is alkyl, haloalkyl, aryl, haloaryl, alkylaryl, haloalkylaryl, arylalkyl, haloarylalkyl, cycloalkyl or cyclohaloalkyl; and n is 0 or 1.

3. The composition of claim 2 wherein said dicarboxylic acid is an aromatic dicarboxylic acid.

4. The composition of claim 3 wherein said aromatic dicarboxylic acid is selected from the group consisting of isophthalic acid, terephthalic acid, and mixtures thereof.

5. The composition of claim 1 wherein said bisphenol has the formula:

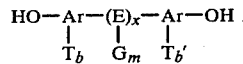

wherein Ar is aromatic, G is alkyl, haloalkyl, aryl, haloaryl, alkylaryl, haloalkylaryl, arylalkyl, haloarylalkyl, cycloalkyl, or cyclohaloalkyl; E is divalent alkylene, haloalkylene, cycloalkylene, halocycloalkylene, arylene, or haloarylene, —O—, —S—, —SO—, —SO$_2$—, —SO$_3$—, —CO—,

or GN<; T and T' are independently selected from the group consisting of halogen, G and OG; m is an integer from 0 to the number of replaceable hydrogen atoms on E; b is an integer from 0 to the number of replaceable hydrogen atoms on Ar, and x is 0 or 1.

6. The composition of claim 5 wherein the bisphenol is bisphenol-A.

7. The composition of claim 1 wherein said linear aromatic polyester includes an aliphatic modifier having the formula:

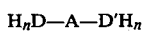

wherein D and D' are independently selected from the group consisting of O, S, and N; A is a bivalent or disubstituted aliphatic radical, free of tertiary carbon atoms, and n is an integer from 1 to 2 with n being 2 when D and/or D' are N.

8. The composition of claim 7 wherein said aliphatic modifier is a glycol of 2 to 100 carbon atoms.

9. The composition of claim 8 wherein said glycol is selected from the group consisting of neopentyl glycol, diethylene glycol, ethylene glycol, and mixtures thereof.

10. The composition of claim 1 wherein said disulfonic acid has the formula:

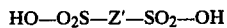

wherein Z' is alkylene or cycloalkylene of 2 to 6 carbon atoms, —Ar— or —Ar—Y'—Ar— where Ar is aromatic, Y' is alkylene, haloalkylene, —O—, —S—, —SO$_2$—, —CO— and GN<; wherein G is alkyl, haloalkyl aryl, haloaryl, alkylaryl, haloalkylaryl, arylalkyl, haloarylalkyl, cycloalkyl or cyclohaloalkyl.

11. The composition of claim 10 wherein the disulfonic acid is an aromatic disulfonic acid.

12. The composition of claim 11 wherein the aromatic disulfonic acid is selected from the group consisting of 1,4-, 1,3- and 1,2-benzene disulfonic acids, 2,4-toluene disulfonic acid, 2,7-naphthalene disulfonic acid, 4,4'-diphenyl disulfonic acid, 4,4'-diphenylether disulfonic acid, 4,4'-diphenyl methane disulfonic acid, 3,3'- and 4,4'-diphenyl sulfone disulfonic acids, 2,2'-bis-(4-hydroxysulfonyl phenyl)-propane, 4,5- and 4,6-dichloro-1,3-benzene disulfonic acids and 4,5,6-trichloro 1,3 benzene disulfonic acid.

13. The composition of claim 12 wherein the aromatic disulfonic acid is 4.4'-diphenyl disulfonic acid and the bisphenol is bisphenol-A.

14. The composition of claim 1 wherein the weight ratio of aromatic polyester to aromatic polysulfonate is about 5:95 to about 95:5.

15. The composition of claim 14 wherein the weight ratio of the aromatic polyester to aromatic polysulfonate is about 30:70 to about 70:30.

16. The composition of claim 1 wherein the aromatic polyester is prepared by melt polymerization.

17. The composition of claim 1 which also includes a filler material.

18. The composition of claim 17 wherein the filler material is glass fiber.

19. A thermoplastic polymeric composition comprising a solid solution polyblend of (a) a polyester selected from the group consisting of poly-(bisphenol A-isophthalate), poly-(bisphenol A-terephthalate) and bisphenol-A isophthalate-terephthalate polyester and (b) bisphenol-A-4,4' diphenyl disulfonate polysulfonate, the proportion of said polyester to said polysulfonate being about 30:70 to about 70:30.

20. A molded article formed from the composition of claim 1.

21. A film prepared from the composition of claim 1.

* * * * *